US012534236B2

(12) United States Patent
Murphy et al.

(10) Patent No.: US 12,534,236 B2
(45) Date of Patent: Jan. 27, 2026

(54) SYSTEMS, METHODS, AND DEVICES FOR EXTRACTION MATERIAL DISTRIBUTION

(71) Applicant: Starbucks Corporation, Seattle, WA (US)

(72) Inventors: Kieran A. Murphy, Seattle, WA (US); Jefferey Jean Chapman, Seattle, WA (US); Michael Lane, Seattle, WA (US); Dariusz P. Piech, Seattle, WA (US); John L. Brockman, Edmonds, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/658,174

(22) Filed: May 8, 2024

(65) Prior Publication Data
US 2024/0375800 A1 Nov. 14, 2024

Related U.S. Application Data

(60) Provisional application No. 63/501,870, filed on May 12, 2023.

(51) Int. Cl.
B65B 1/06 (2006.01)
B65B 1/22 (2006.01)
B65B 63/00 (2006.01)

(52) U.S. Cl.
CPC .............. B65B 1/06 (2013.01); B65B 1/22 (2013.01); B65B 63/00 (2013.01)

(58) Field of Classification Search
CPC ... B65B 1/06; B65B 1/22; B65B 63/00; A47J 31/401; A47J 31/404; A47J 31/42

USPC .................... 141/99, 236, 237, 238
See application file for complete search history.

(56) References Cited

U.S. PATENT DOCUMENTS

| 5,839,610 | A | 11/1998 | Reese et al. |
| 2004/0118294 | A1 | 6/2004 | Grassedonio |
| 2007/0295752 | A1* | 12/2007 | Morin .................. A47J 31/404 222/173 |
| 2011/0256273 | A1* | 10/2011 | de Graaff ............... A47J 42/50 426/106 |

(Continued)

FOREIGN PATENT DOCUMENTS

| EP | 1250077 B1 | 8/2003 |
| WO | WO 1995/11613 A2 | 5/2003 |
| WO | WO 2011/130439 A2 | 10/2011 |

OTHER PUBLICATIONS

Modes of Vibration For Common Piezoelectric Shapes, APC International, accessed on May 23, 2023, 1 page, available at: https://www.americanpiezo.com/knowledge-center/piezo-theory/vibration/.

Primary Examiner — Jason K Niesz
(74) Attorney, Agent, or Firm — Knobbe, Martens, Olson & Bear, LLP

(57) ABSTRACT

The disclosure generally relates to a system for distributing extraction material to a plurality of extraction chambers. The system may include a hopper configured to hold a beverage ingredient, and a grinder configured to grind the beverage ingredient to generate the extraction material. In some embodiments, the system can include a plurality of grinders coupled to the plurality of extraction chambers. In some embodiments, the system can include a plurality of distribution paths configured to distribute the extraction material to the plurality of extraction chambers.

16 Claims, 11 Drawing Sheets

(56) References Cited

U.S. PATENT DOCUMENTS

2019/0328177 A1* 10/2019 Parrini .................... A47J 42/44

* cited by examiner

SYSTEMS, METHODS, AND DEVICES FOR EXTRACTION MATERIAL DISTRIBUTION

INCORPORATION BY REFERENCE TO ANY PRIORITY APPLICATIONS

This application claims priority to U.S. Provisional Patent Application No. 63/501,870, filed May 12, 2023, the entirety of which is incorporated herein by reference.

FIELD

The present disclosure relates to systems, methods, and devices for distributing extraction material to a plurality of extraction chambers, such as, in certain embodiments, a plurality of extraction chambers for fractional extraction.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

In some embodiments, a system for distributing extraction material to a plurality of extraction chambers can include a hopper configured to hold a beverage ingredient; a grinder configured to grind the beverage ingredient to generate extraction material; a distributor configured to transfer extraction material from the grinder to a plurality of distribution paths; a plurality of cells, each of the plurality of cells including a recess configured to hold extraction material; a first gate including a plurality of holes, the first gate configured to move between an open position and a closed position, wherein the plurality of holes are positioned beneath the plurality of distribution paths when the first gate is in the open position, wherein when the first gate is in the open position, extraction material in the plurality of distribution paths enter the plurality of cells, and wherein when the first gate is in a closed position, the first gate prevents extraction material in the plurality of distribution paths from entering the plurality of cells; a plurality of second gates, each of the plurality of second gates including a hole, wherein the plurality of second gates are each configured to move between an open position and a closed position, wherein the hole is positioned beneath a cell of the plurality of cells when the plurality of second gates are in the open position, wherein when the plurality of second gates are in the open position, extraction material in the plurality of cells is transferred to a plurality of extraction chambers, and wherein when the plurality of second gates are in the closed position, the plurality of second gates prevent extraction material in the plurality of cells from transferring to the plurality of extraction chambers.

In some embodiments, a system for distributing extraction material to a plurality of extraction chambers can include a hopper configured to hold a beverage ingredient; a grinder configured to grind the beverage ingredient to generate extraction material; a distributor configured to transfer extraction material from the grinder to a plurality of distribution paths; a first gate including a plurality of holes positioned beneath the plurality of distribution paths, the first gate configured to rotate between an open position and a closed position, wherein the plurality of holes are positioned beneath the plurality of distribution paths when the first gate is in the open position; a platform including a plurality of holes; and a plurality of second gates coupled to the platform, each of the plurality of second gates including a first cell and a second cell, wherein the plurality of second gates are configured to rotate to position the first cells and the second cells beneath the plurality of distribution paths, wherein when the first gate is in the open position, extraction material in the plurality of distribution paths enter the first cells or the second cells of the plurality of second gates, and wherein when the first gate is in a closed position, the first gate prevents extraction material in the plurality of distribution paths from entering the first cells or the second cells of the plurality of second gates, and wherein when the second cells of the plurality of second gates are positioned beneath the plurality of distribution paths, the first cells are positioned above the plurality of holes of the platform so extraction material in the first cells is transported to a plurality of extraction chambers.

In some embodiments, a system for distributing extraction material to a plurality of extraction chambers can include a hopper configured to hold a beverage ingredient; a plurality of grinders configured to grind the beverage ingredient to generate extraction material; and a plurality of extraction chambers, the hopper is configured to transfer the beverage ingredient to the plurality of grinders, and wherein each of the plurality of grinders are connected to a different extraction chamber of the plurality of extraction chambers, and wherein each of the plurality of grinders are configured transfer the extraction material to the different extraction chamber of the plurality of extraction chambers.

In some embodiments, a system for distributing extraction material to a plurality of extraction chambers can include a grinder configured to grind a beverage ingredient to generate extraction material; a hopper configured to hold the extraction material, the hopper including a bottom end; a first distributor positioned at the bottom end of the hopper, the first distributor including a first recess configured to hold extraction material; a second distributor positioned at the bottom end of the hopper, the second distributor including a second recess configured to hold extraction material; and a plurality of extraction chamber distribution paths configured to transfer extraction material to a plurality of extraction chambers, and wherein the first distributor and the second distributor are configured to rotate in a first direction and a second direction, wherein the first recess and the second recess are configured to receive extraction material from the hopper, and wherein the first distributor is configured to transfer extraction material in the first recess to a first extraction chamber distribution path when the first distributor rotates in the first direction and the first distributor is configured to transfer extraction material in the first recess to a second extraction chamber distribution path when the first distributor rotates in the second direction, and wherein the second distributor is configured to transfer extraction material in the second recess to a third extraction chamber distribution path when the second distributor rotates in the first direction and the second distributor is configured to transfer extraction material in the second recess to a fourth extraction chamber distribution path when the second distributor rotates in the second direction.

In some embodiments, a system for distributing extraction material to a plurality of extraction chambers can include a hopper configured to hold a beverage ingredient; a grinder configured to grind the beverage ingredient to generate extraction material; a distribution system configured to transfer the extraction material from the grinder to a plurality extraction chambers, and the distribution system can be configured to transfer a predetermined amount of the extraction material to each empty extraction chamber of the plurality of extraction chambers, and a total amount of extraction material provided to the plurality of extraction chambers can be an amount of extraction material for one beverage component.

In some embodiments, the system can further include a piezoelectric actuator configured to vibrate the distribution system to prevent or inhibit the extraction material from getting stuck in the distribution system.

In some embodiments, the distribution system can include a distributor configured to transfer extraction material from the grinder to a plurality of distribution paths; a plurality of chamber distribution paths configured to direct extraction material the plurality of extraction chambers; and a plurality of cells, each cell of the plurality of cells positioned between one of the plurality of distribution paths and one of the plurality of chamber distribution paths, the each cell configured to receive the extraction material from one of the plurality of distribution paths, wherein each cell is configured selectively transfer the predetermined amount of extraction material to one or more of the chamber distribution paths.

In some embodiments, in use, the distributor can be configured to provide a same amount of extraction material to each distribution path of the plurality of distribution paths.

In some embodiments, the distribution system can further include a first gate positioned between the plurality of distribution paths and the plurality of cells, the first gate can be configured to move between an open position and a closed position, when the first gate is in the open position, extraction material in the plurality of distribution paths can enter the plurality of cells and when the first gate is in the closed position the first gate can prevent extraction material from entering the plurality of cells.

In some embodiments, the system can further include a plurality of second gates positioned between the plurality of cells and the plurality of chamber distribution paths, the plurality of second gates can be configured to independently move between an open position and a closed position, when the plurality of second gates are in the open position, extraction material in the plurality of cells can be transferred to the plurality of chamber distribution paths, and when the plurality of second gates are in the closed position, the plurality of second gates can prevent extraction material in the plurality of cells from transferring to plurality of chamber distribution paths.

In some embodiments, a second gate of the plurality of second gates can be moved to an open position when a corresponding extraction chamber is empty.

In some embodiments, the first gate can be configured to rotate to move between the open position and the closed position.

In some embodiments, the system can further include a plurality of second gates, each second gate can include one or more cells of the plurality of cells, the plurality of second gates can be configured to rotate to move the one or more cells from a first position to a second position.

In some embodiments, the one or more cells can be positioned below the plurality of distribution paths when the one or more cells are in the first position and the one or more cells can be positioned above the plurality of chamber distribution paths when the one or more cells are in the second position.

In some embodiments, the hopper can be a first hopper and the distribution system can include a second hopper configured to receive extraction material from the grinder; and a plurality of distributors positioned at a bottom end of the second hopper, each distributor of the plurality of distributors can include a recess configured to receive extraction material from the second hopper, in use, the plurality of distributors can be configured to rotate in a first direction to transfer extraction material to a first set of chamber distribution paths of the plurality of chamber distribution paths and a second direction to transfer extraction material to a second set of chamber distribution paths of the plurality of chamber distribution paths.

In some embodiments, a system for distributing extraction material to a plurality of extraction chambers can include a hopper configured to hold a beverage ingredient; a grinder configured to grind the beverage ingredient to generate extraction material; a distribution system configured to transfer extraction material from the grinder to a plurality of extraction chambers, the distribution system can be configured to transfer a predetermined amount of extraction material to each of the plurality of extraction chambers, the distribution system can include a plurality of distribution paths; a plurality of chamber distribution paths, each of the plurality of chamber distribution paths can be configured to direct extraction material to a corresponding extraction chamber of the plurality of extraction chambers; and a first gate between the plurality of distribution paths and a plurality of second gates, the first gate can be configured to rotate between an open position and a closed position, each of the plurality of second gates can include a cell, each of the plurality of second gates can be configured to rotate between a first position and a second position, wherein in the first position, the cell can be aligned with one of the plurality of distribution paths and in the second position the cell can be aligned with a corresponding chamber distribution path of the plurality of chamber distribution paths, and when the first gate is in the open position, extraction material in each of the plurality of distribution paths can enter the cell of each of the plurality of second gates in the first position, and wherein when the first gate is in a closed position, the first gate can prevent extraction material in each of the plurality of distribution paths from entering the cell of each of the plurality of second gates in the first position.

In some embodiments, the plurality of second gates can be coupled to a platform.

In some embodiments, the first gate can include a plurality of holes, each of the plurality of holes can be aligned with a distribution path when the first distribution path when the first gate is in the open position.

In some embodiments, the extraction material can be gravity fed through the distribution system.

In some embodiments, the cell of each of the plurality of second gates can be a first cell and each of the plurality of second gates can include a second cell.

In some embodiments, in the first position the second cell can be aligned with one of the plurality of chamber distribution paths and in the second position the second cell can be aligned with one of the plurality of distribution paths.

In some embodiments, the each of the plurality of second gates can be configured to rotate from the first position and the second position when the corresponding extraction chamber of the corresponding chamber distribution path is empty.

In some embodiments, in use, a total amount of extraction material provided to the plurality of extraction chambers can be an amount of extraction material for one beverage component.

In some embodiments, the system can further include a piezoelectric actuator configured to vibrate the distribution system to prevent or inhibit the extraction material from getting stuck in the distribution system.

In some embodiments, the system can further include a distributor configured to transfer extraction material from the grinder to the plurality of distribution paths.

In some embodiments, in use, the distributor can be configured to provide a same amount of extraction material to each distribution path of the plurality of distribution paths.

In some embodiments, in use, the distribution system can be configured to provide the predetermined amount of extraction material to empty extraction chambers of the plurality of extraction chambers.

In some embodiments, a system for distributing extraction material to a plurality of extraction chambers, the system can include a hopper configured to hold a beverage ingredient; a plurality of grinders configured to grind the beverage ingredient to generate extraction material; and a plurality of extraction chambers, the hopper can be configured to transfer the beverage ingredient to the plurality of grinders, and each of the plurality of grinders can be connected to a different extraction chamber of the plurality of extraction chambers, and a predetermined amount of the extraction material can be transferred from each of the plurality of grinders to the different extraction chambers of the plurality of extraction chambers.

In some embodiments, in use, the extraction material can be transferred from one or more grinders of the plurality of grinders to the different extraction chamber when the different extraction chamber is empty.

In some embodiments, in use, a predetermined amount of beverage ingredient can be transferred from the hopper to the one or more grinders.

In some embodiments, each of the plurality of grinders can be configured to grind the predetermined amount of the extraction material.

In some embodiments, in use, a predetermined amount of the beverage ingredient can be transferred from the hopper to each of the plurality of grinders.

In some embodiments, in use, a total amount of extraction material provided to the plurality of extraction chambers can be an amount of extraction material for one beverage component.

In some embodiments, the system can further include a piezoelectric actuator configured to vibrate the distribution system to prevent or inhibit the extraction material from getting stuck in the hopper and/or the plurality of grinders.

In some embodiments, a system for distributing extraction material to a plurality of extraction chambers can include a hopper configured to hold a beverage ingredient; a grinder configured to grind the beverage ingredient to generate extraction material; a distribution system configured to transfer extraction material from the grinder to a plurality of extraction chambers, the distribution system can be configured to transfer a predetermined amount of extraction material to each of the plurality of extraction chambers, the distribution system can include a plurality of distribution paths; a plurality of chamber distribution paths configured to direct extraction material to the plurality of extraction chambers; a plurality of cells positioned between the plurality of distribution paths and the plurality of chamber distribution paths, each of the plurality of cells can include a recess configured to hold extraction material; a first gate configured to move between an open position and a closed position, extraction material in each of the plurality of distribution paths can enter each of the plurality of cells when the first gate is in the open position, and the first gate can prevent extraction material in each of the plurality of distribution paths from entering each of the plurality of cells when the first gate is in a closed position; each of the plurality of cells can be configured to selectively transfer the predetermined amount of extraction material to one or more chamber distribution paths of the chamber distribution paths.

In some embodiments, the system can further include a plurality of second gates positioned between the plurality of cells and the plurality of chamber distribution paths, each of the plurality of second gates can be configured to independently move between an open position and a closed position.

In some embodiments, in use, extraction material in a cell of the plurality of cells can be transferred to a corresponding chamber distribution path of the plurality of chamber distribution paths when a second gate of the plurality of second gates positioned between the cell and the corresponding chamber distribution path is in the open position.

In some embodiments, the second gate can prevent extraction material in the cell from transferring to the corresponding chamber distribution paths when the second gate is in the closed position.

In some embodiments, the second gate can be configured to move from the closed position to the open position when a corresponding extraction chamber of the plurality of extraction chambers is empty.

In some embodiments, the first gate can include a plurality of holes.

In some embodiments, the plurality of holes can be aligned with the plurality of distribution paths when the first gate is in the open position.

In some embodiments, in use, the distribution system can be configured to provide the predetermined amount of extraction material to empty extraction chambers of the plurality of extraction chambers.

In some embodiments, the one or more chamber distribution paths can include chamber distribution paths with empty corresponding extraction chambers of the plurality of extraction chambers.

In some embodiments, in use, a total amount of extraction material provided to the plurality of extraction chambers can be an amount of extraction material for one beverage component.

In some embodiments, the system can further include a distributor configured to transfer extraction material from the grinder to the plurality of distribution paths.

In some embodiments, in use, the distributor can be configured to provide a same amount of extraction material to each distribution path of the plurality of distribution paths.

In some embodiments, the extraction material can be gravity fed through the distribution system.

In some embodiments, the system can further include a piezoelectric actuator configured to vibrate the distribution system to prevent or inhibit the extraction material from getting stuck in the distribution system.

In some embodiments, a system for distributing extraction material to a plurality of extraction chambers can include a grinder configured to grind a beverage ingredient to generate extraction material; a hopper configured to hold the extraction material, the hopper including a bottom end; a distribution system including a distributor, the distributor can include a recess and can be configured to axially rotate to transfer extraction material in the recess, and the distributor can be configured to transfer extraction material to a first extraction chamber when the distributor is in a first position and a second extraction chamber when the distributor is in a second position.

In some embodiments, the distributor can be configured to axially rotate in a first direction in order to rotate to the first position and a second direction in order to rotate to the second position.

In some embodiments, the system can further include a first extraction chamber distribution path configured to transfer extraction material from the distributor to the first extraction chamber, and a second extraction chamber distribution path configured to transfer extraction material from the distributor to the second extraction chamber.

In some embodiments, the distributor can be positioned at the bottom end of the hopper.

In some embodiments, the recess can include an opening, and a portion of the bottom end of the hopper can retain extraction material positioned above the opening in the hopper when the distributor moves to the first position or the second position.

In some embodiments, the distributor can be a first distributor and the distribution system can further include a second distributor configured to transfer extraction material to a third extraction chamber when the second distributor is in a third positioned and a fourth extraction chambers when the second distributor is in a fourth position.

In some embodiments, the second distributor can be configured to axially rotate in a first direction in order to rotate to the third position and a second direction in order to rotate to the fourth position.

In some embodiments, the first distributor can be configured to axially rotate in the first direction in order to rotate to the first position and the second direction in order to rotate to the second position.

In some embodiments, the distributor can be configured to move to the first position when the first extraction chamber is empty and the second position when the second extraction chamber is empty.

In some embodiments, the system can further include a piezoelectric actuator configured to vibrate the hopper and/or the distribution system to prevent or inhibit the extraction material from getting stuck in the hopper and/or the distribution system.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION

Figure 1A:
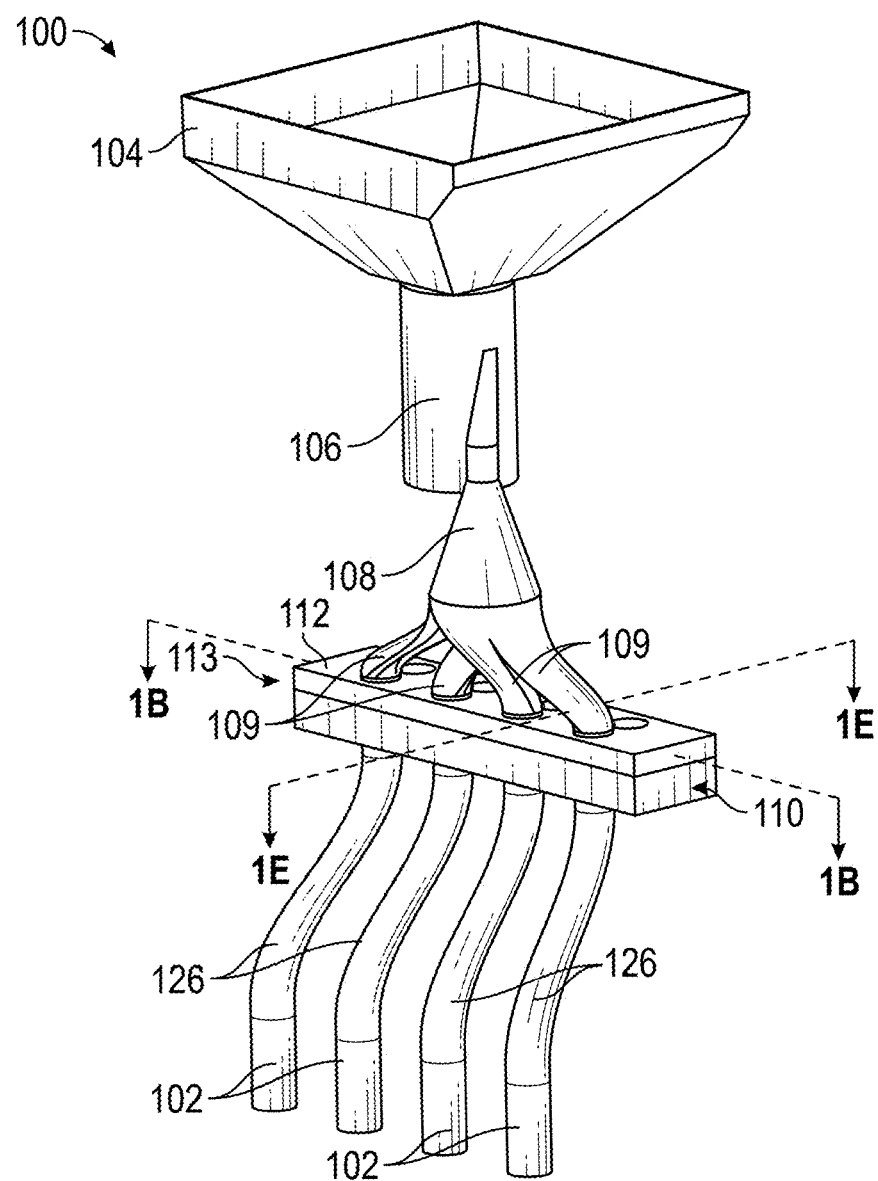
FIGS. 1A-1E illustrate a system for providing extraction material to a plurality of extraction chambers.

Extracted or brewed beverages, such as coffee or tea, usually require extracting desirable flavors, aromas, or compounds from an extract (i.e., coffee beans, tea leaves, etc.) in an extraction chamber. An extraction material (e.g., heated or ambient water) is added to or forced through the extraction chamber to extract the desirable flavors, aromas, or compounds. However, as a desired amount/volume of the beverage increases, an extraction time required to extract the desirable flavors, aromas, or compounds from the extract in the chamber to produce the desired amount/volume of the beverage increases. The increased extraction time may reduce throughput of beverages or a rate at which beverages may be made while maintain a quality of the beverage.

The extraction time required to make the desired amount/volume of a beverage may be decreased by extracting the beverage through a plurality of extraction chambers. However, in order to extraction the beverage through the plurality of extraction chambers, extraction material must be provided to each of the plurality of extraction chambers.

It may be desirable to provide a same amount/volume of the extraction material to each extraction chamber of the plurality of extraction chambers and/or a portion of the plurality of extraction chambers.

In accordance with several embodiments, the systems, methods, and devices described herein advantageously provide extraction material to a plurality of extraction chambers simultaneously. The systems, methods, and device disclosed herein may provide extraction material one or more of the plurality of extraction chambers. The plurality of extraction chambers may receive a predetermined amount/volume of extraction material based on a particular beverage order and/or an amount/volume of the beverage to be extracted.

FIGS. 1A-1E show an embodiment of a system 100 for providing extraction material to a plurality of extraction chambers 102. The system 100 may include a hopper 104, a grinder 106, and/or a distribution system 107. The distribution system 107 may include a distributor 108, a plurality of cells 110, a first gate 112, and/or a plurality of second gates 114. The hopper 104 may be configured to hold a beverage ingredient. In some embodiments, the beverage ingredient may include an edible substance and may also be, in whole or in part (e.g., ground), at least one of green coffee cherries, red coffee cherries, white coffee, roasted coffee beans, unroasted coffee beans, espresso coffee, coffee flowers, coffee cherry pulp, coffee cherry stalk, coffee cherry exocarp, or coffee cherry mesocarp. However, it should be appreciated that certain features and aspects of the embodiments disclosed herein may be applicable to other beverages besides coffee extracts, such as teas and other similar infusions. For example, in yet other embodiments, the beverage ingredient may be green tea leaves and/or partially or totally dehydrated tea leaves. In still further embodiments, the extraction medium may comprise fruits, nuts, or similar plant matter including vanilla beans, chocolate beans, hazelnuts, almond, macadamia, peanut, cinnamon, mint, apple, apricot, aromatic bitters, banana, blackberry, blueberry, celery, cherry, cranberry, strawberry, raspberry, juniper berry, brandy, cachaca, carrot, citrus, lemon, lime, orange, grapefruit, tangerine, coconut, menthol, ginger, licorice, milk, pecan, pistachio, walnut, peach, pear, pepper, among others. Thus, the description herein is not limited to espresso, coffee, coffee products, tea or tea products.

The hopper 104 may be configured to transfer or transport the beverage ingredient to the grinder 106. In some embodiments, the beverage ingredient may be gravity fed to the grinder 106. In some embodiments, an auger or other mechanism may be configured to transfer or transport the beverage ingredient to the grinder 106. The grinder 106 may be configured to grind and/or crush the beverage ingredient from a whole configuration (e.g., whole coffee beans) to a ground configuration (e.g., ground coffee) to produce (e.g., generate) extraction material. The grinder 106 may be configured to grind and/or crush the beverage ingredient to a particular size. In some embodiments, the particular size may be based on a type of the beverage to be extracted from the plurality of extraction chambers 102. In some embodiments, the grinder 106 may include a blade grinder, a conical burr grinder, a flat burr grinder, and/or any other type of grinder.

The grinder 106 may be configured to transfer or transport the extraction material to the distributor 108. In some embodiments, the extraction material may be gravity fed to the distributor 108. In some embodiments, an auger or other mechanism may be configured to transfer or transport the extraction material to the distributor 108.

The distributor 108 may include a recess configured to hold the extraction material. In some embodiments, the distributor 108 may include a sensor configured to determine an amount/volume of extraction material in the distributor 108. The distributor 108 may include a plurality of distribution paths 109. The plurality of distribution paths 109 may be configured to transfer or transport the extraction material to the plurality of cells 110. In some embodiments, as shown in FIG. 1B, a first distribution path 109A may transfer or transport the extraction material to a first cell 110A, a second distribution path 109B may transfer or transport the extraction material to a second cell 110B, a third distribution path 109C may transfer or transport the extraction material to a third cell 110C, and/or a fourth distribution path 109D may transfer or transport the extraction material to a fourth cell 110D.

Figure 1B:
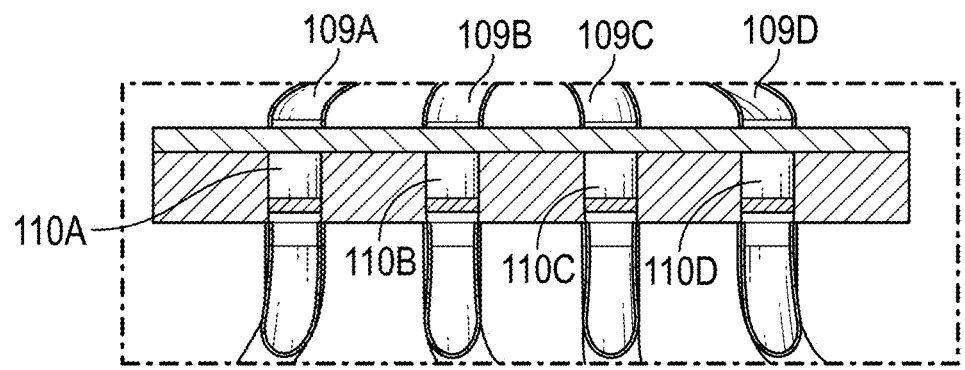
Figure 1C:
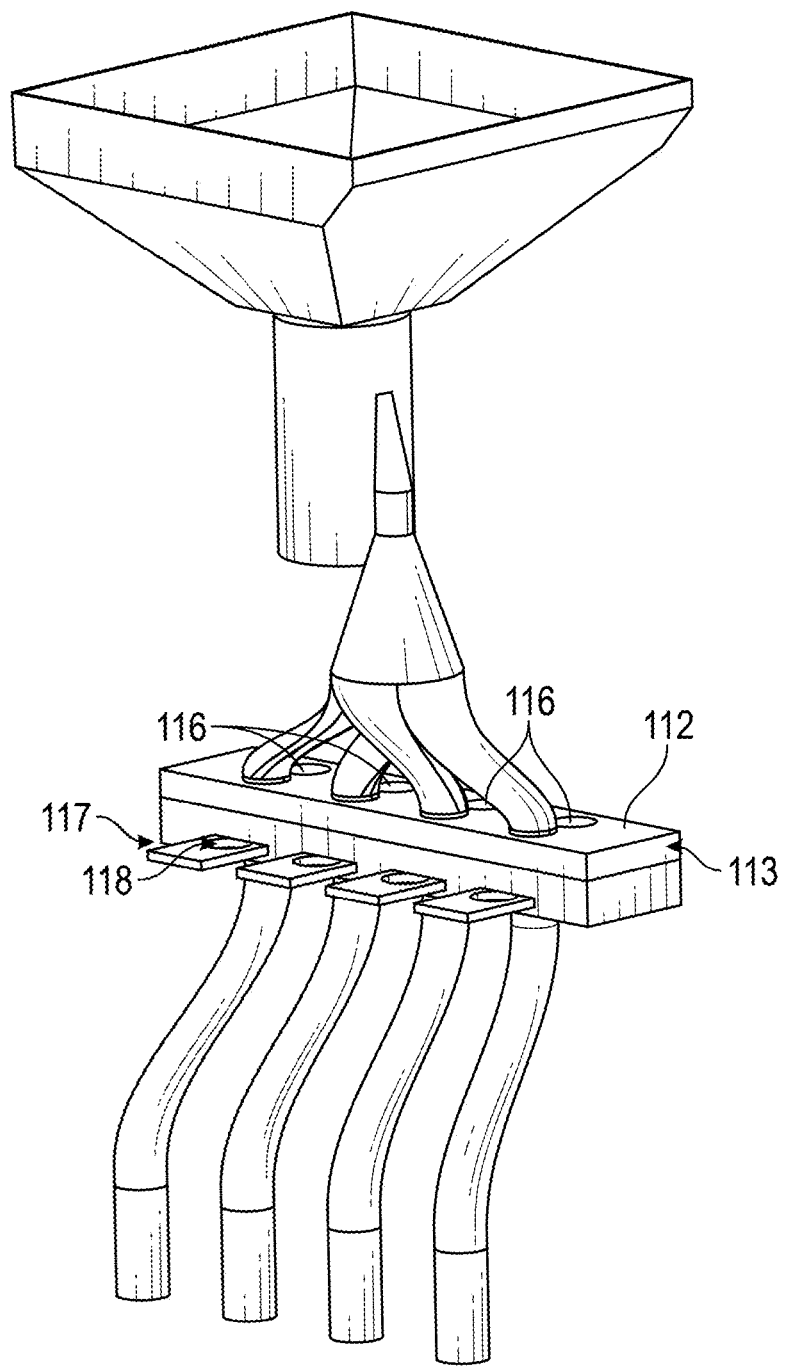
Figure 1D:
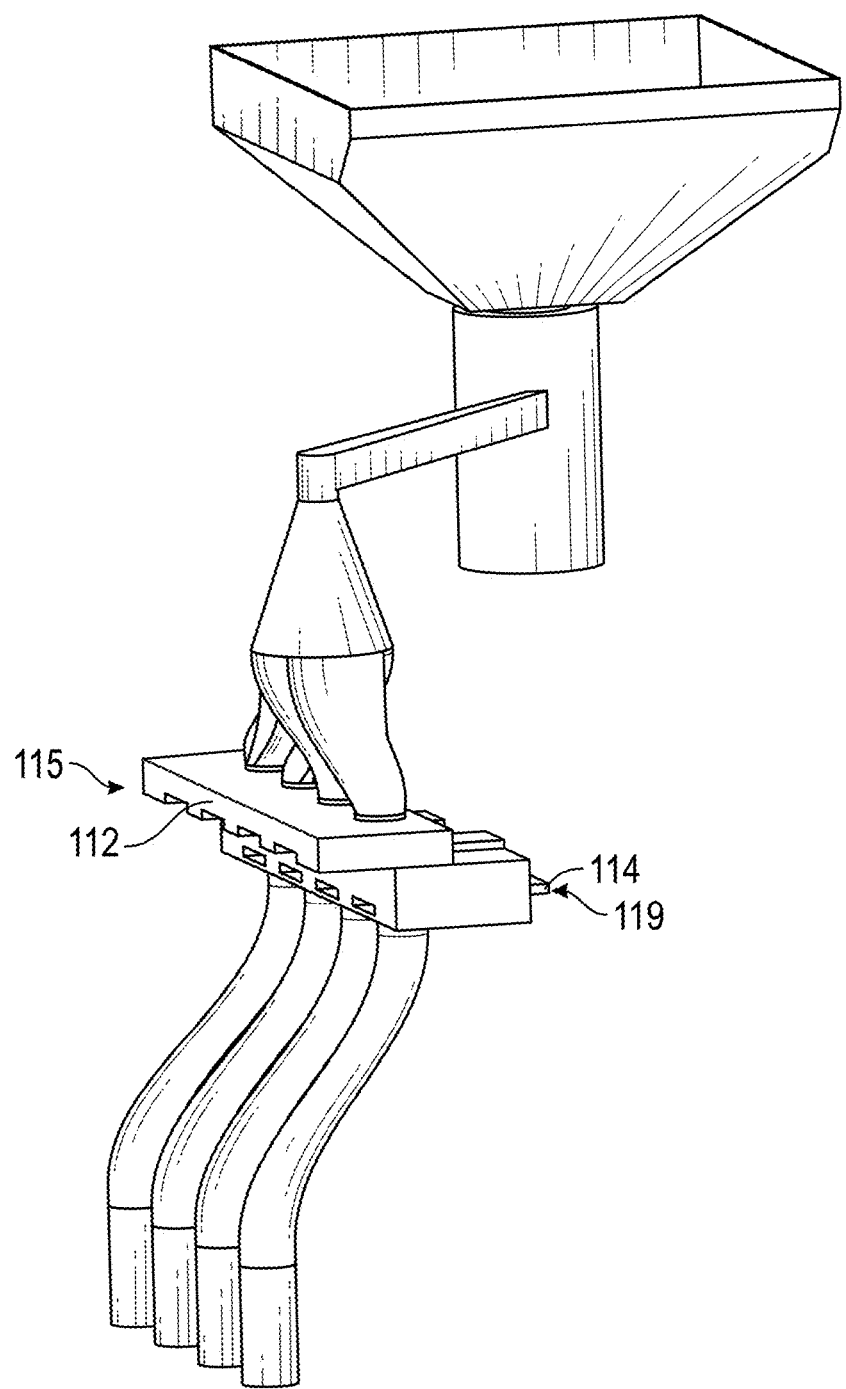
Figure 1E:
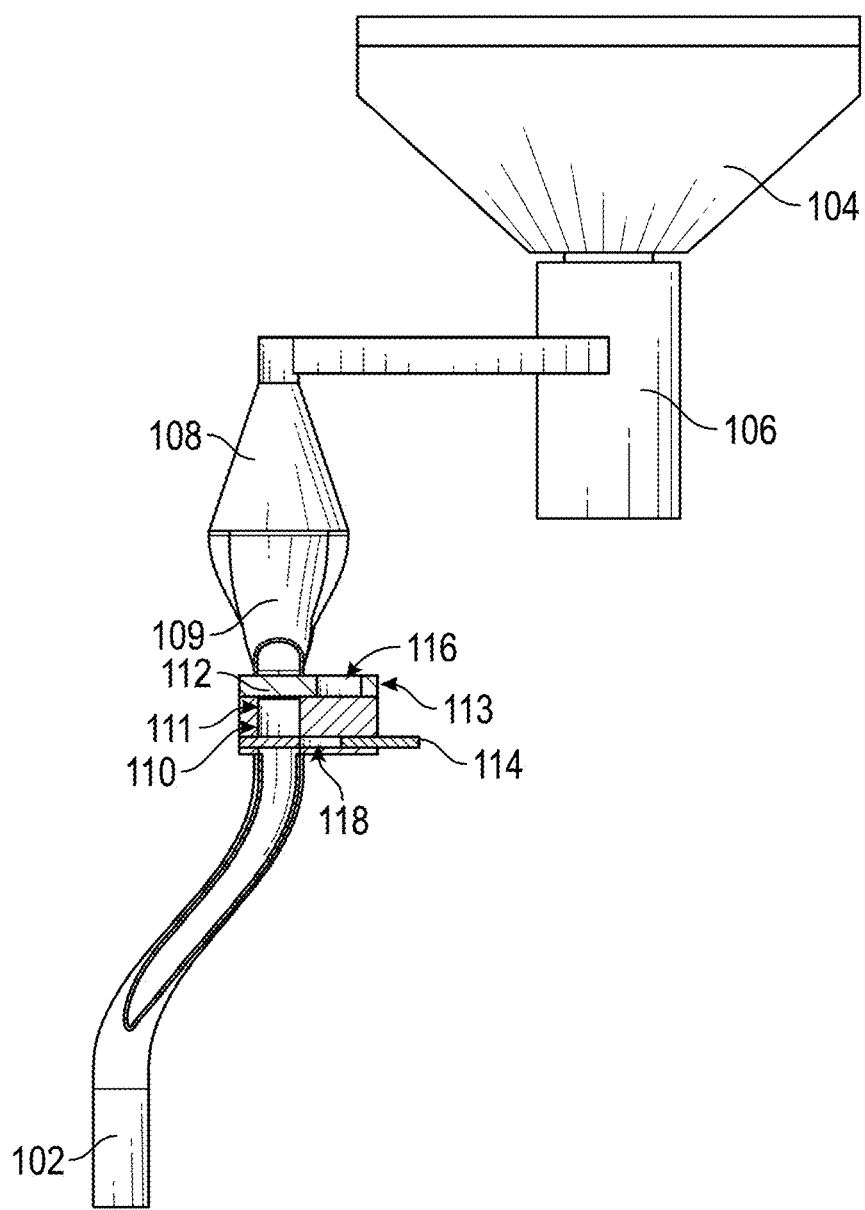

As shown in FIG. 1E, the plurality of cells 110 may each include a recess 111 configured to hold a particular amount/volume of the extraction material. In some embodiments, the particular amount/volume of the extraction material may include an amount/volume of extraction material the plurality of extraction chambers 102 are configured to use to extract a beverage component. In some embodiments, a total amount/volume of the extraction material provided to the plurality of extraction chambers 102 may include an amount/volume of extraction material for one beverage component.

In some embodiments, the amount/volume of extraction material for one beverage component may include between 13 grams and 19 grams of extraction material. In some embodiments, the total amount/volume of extraction material may be an amount sufficient to brew a component for a coffee beverage of 3 fluid ounces to 96 fluid ounces (e.g., from 3 fluid ounces to 20 fluid ounces, from 3 fluid ounces to 30 fluid ounces, from 8 fluid ounces to 30 fluid ounces, from 8 fluid ounces to 64 fluid ounces, overlapping ranges thereof, or any value within the recited ranges such as 3 fluid ounces, 4 fluid ounces, 8 fluid ounces, 12 fluid ounces, 16 fluid ounces, 20 fluid ounces, 30 fluid ounces, 31 fluid ounces, 48 fluid ounces, 96 fluid ounces). In some embodiments, the term "one beverage component" may refer to a single shot of espresso and/or a double shot of espresso. In some embodiments, the term "one beverage component" may refer to a component for a beverage of a serving size appropriate for consumption by a single individual (e.g., 8 fluid ounces, 4 fluid ounces to 24 fluid ounces, 4 fluid ounces to 16 fluid ounces, 8 fluid ounces to 24 fluid ounces).

As shown in FIG. 1E, the first gate 112 may be positioned between the plurality of distribution paths 109 and the plurality of cells 110. The first gate 112 may be configured to move between a closed position 113, as shown in FIGS. 1C and 1E, and an open position 115, as shown in FIG. 1D. When the first gate 112 is in the closed position 113, the first gate 112 may prevent or inhibit the extraction material from entering the plurality of cells 110, as shown in FIG. 1E.

In some embodiments, the first gate 112 may include a plurality of holes 116. When the first gate 112 is in the open position 115, the plurality of holes 116 may be positioned between (e.g. aligned with) the plurality of distribution paths 109 and the plurality of cells 110. Accordingly, the extraction material in the plurality of distribution paths 109 may enter the plurality of cells 110. In some embodiments, if one or more of the plurality of cells 110 are filled with extraction material, when the first gate 112 is in the open position 115, the extraction material in the one or more of the plurality of cells 110 may prevent or inhibit additional extraction material from entering the one or more of the plurality of cells 110.

The plurality of cells 110 may be configured to transfer or transport the extraction material to the plurality of extraction chambers 102. In some embodiments, the extraction material may be gravity fed from the plurality of cells 110 to the plurality of extraction chambers 102.

The plurality of second gates 114 may be positioned beneath the plurality of cells 110. In some embodiments, a second gate 114 may be positioned beneath each of the plurality of cells 110. The plurality of second gates 114 may be configured to move between a closed position 117, as shown in FIG. 1C, and an open position 119, as shown in FIG. 1D. When the plurality of second gates 114 are in the closed position 117, the plurality of second gates 114 may prevent or inhibit the extraction material from transferring from the plurality of cells 110 to the plurality of extraction chambers 102.

In some embodiments, the plurality of second gates 114 may each include a hole 118. When the plurality of second gates 114 are in the open position 119, the hole 118 of the plurality of second gates 114 may be positioned beneath the plurality of cells 110. Accordingly, the extraction material in the plurality of cells 110 may transfer from the plurality of cells 110 to the plurality of extraction chambers 102.

In some embodiments, as shown in FIG. 1A, the distribution system 107 may include a plurality of chamber distribution paths 126. The plurality of chamber distribution paths 126 may extend between the plurality of cells 110 the plurality of extraction chambers 102. The plurality of chamber distribution paths 126 may be configured to direct the extraction material from the plurality of cells 110 to the plurality of extraction chambers 102.

In some embodiments, each of the plurality of second gates 114 may be configured to independently move between the closed position 117 and the open position 119. Accordingly, the extraction material may be selectively transferred from the one or more of the plurality of cells 110 to one or more chamber distribution paths 126 of the plurality of chamber distribution paths 126 and/or one or more extraction chambers 102 of the plurality of extraction chambers 102. In some embodiments, the extraction material may be transferred to empty extraction chambers 102 of the plurality of extraction chambers 102 and/or the corresponding chambers distribution paths 126.

Figure 2A:
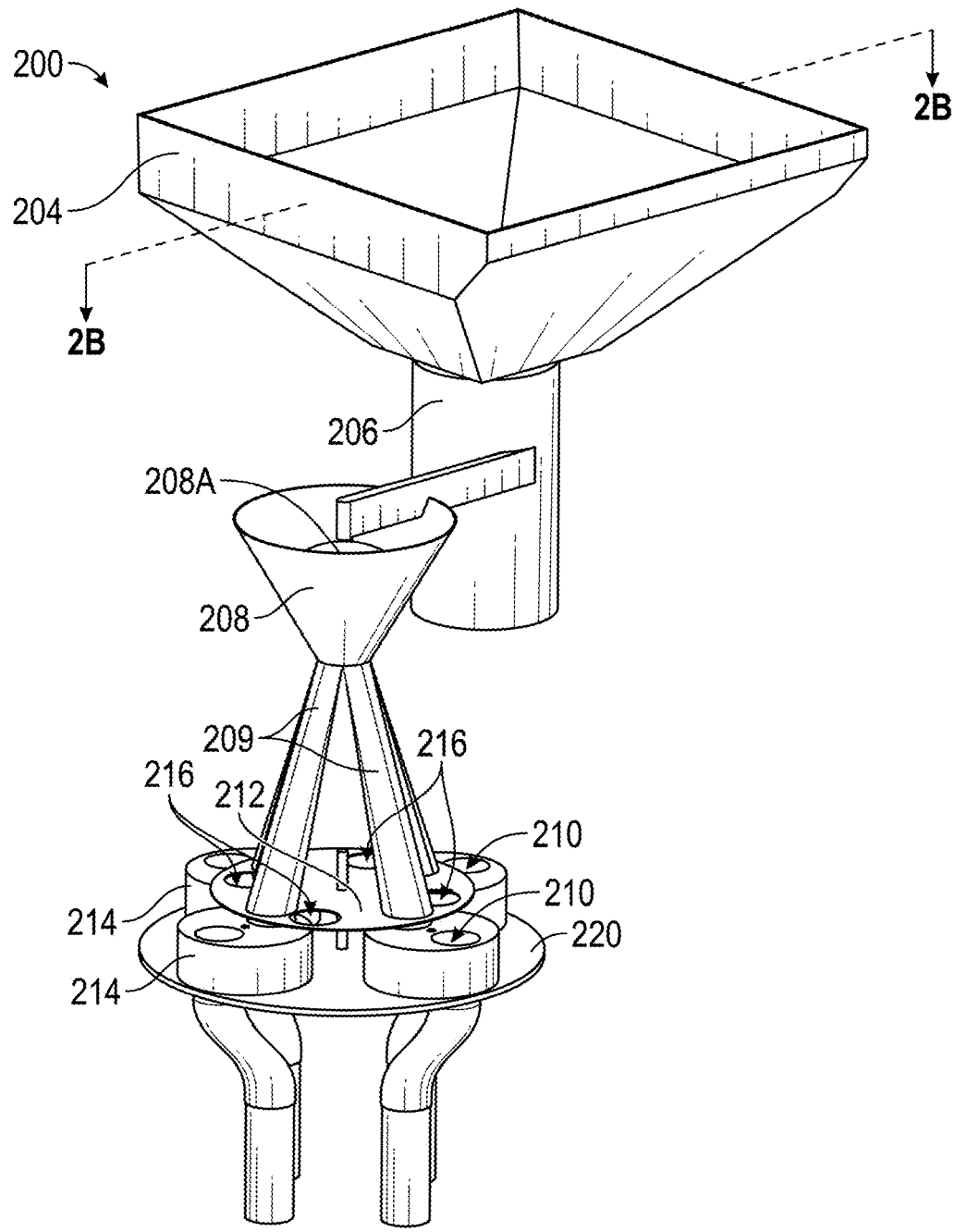
FIGS. 2A-2B illustrate another system for providing extraction material to a plurality of extraction chambers.
Figure 2B:
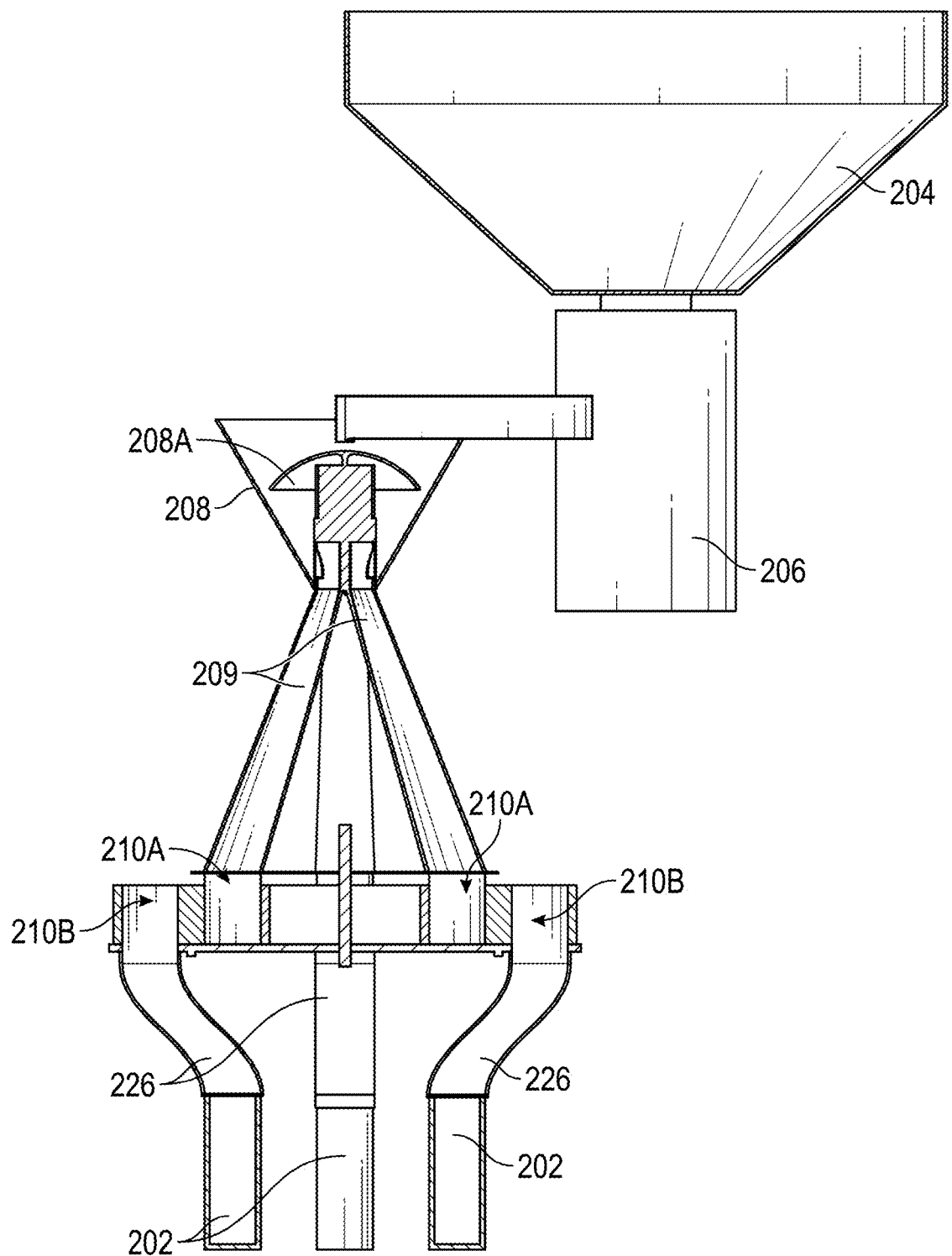
Figure 2C:
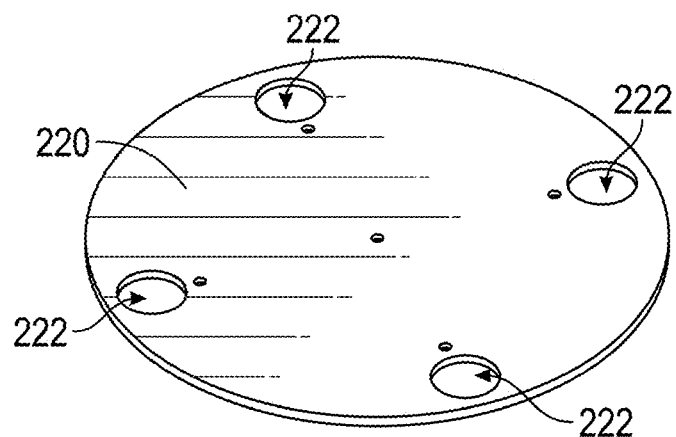
FIG. 2C illustrates a platform of the system for providing extraction material to a plurality of extraction chambers of FIGS. 2A-2B.

FIGS. 2A-2C show an embodiment of a system 200 for providing extraction material to a plurality of extraction chambers 202. The system 200 may include a hopper 204, a grinder 206, and/or a distribution system 207. The distribution system 207 may include a distributor 208, a first gate 212, and/or a plurality of second gates 214. The hopper 204 may be configured to hold a beverage ingredient. In some embodiments, the beverage ingredient may include an edible substance and may also be, in whole or in part (e.g., ground), at least one of green coffee cherries, red coffee cherries, white coffee, roasted coffee beans, unroasted coffee beans, espresso coffee, coffee flowers, coffee cherry pulp, coffee cherry stalk, coffee cherry exocarp, or coffee cherry mesocarp. However, it should be appreciated that certain features and aspects of the embodiments disclosed herein may be applicable to other beverages besides coffee extracts, such as teas and other similar infusions. For example, in yet other embodiments, the beverage ingredient may be green tea leaves and/or partially or totally dehydrated tea leaves. In still further embodiments, the extraction medium may comprise fruits, nuts, or similar plant matter including vanilla beans, chocolate beans, hazelnuts, almond, macadamia, peanut, cinnamon, mint, apple, apricot, aromatic bitters, banana, blackberry, blueberry, celery, cherry, cranberry, strawberry, raspberry, juniper berry, brandy, cachaca, carrot, citrus, lemon, lime, orange, grapefruit, tangerine, coconut, menthol, ginger, licorice, milk, pecan, pistachio, walnut, peach, pear, pepper, among others. Thus, the description herein is not limited to espresso, coffee, coffee products, tea or tea products.

The hopper 204 may be configured to transfer or transport the beverage ingredient to the grinder 206. In some embodiments, the beverage ingredient may be gravity fed to the grinder 206. In some embodiments, an auger or other mechanism may be configured to transfer or transport the beverage ingredient to the grinder 206. The grinder 206 may be configured to grind and/or crush the beverage ingredient from a whole configuration (e.g., whole coffee beans) to a ground configuration (e.g., ground coffee) to produce (e.g., generate) extraction material. The grinder 206 may be configured to grind and/or crush the beverage ingredient to a particular size. In some embodiments, the particular size may be based on a type of the beverage to be extracted from the plurality of extraction chambers 202. In some embodiments, the grinder 206 may include a blade grinder, a conical burr grinder, a flat burr grinder, and/or any other type of grinder.

The grinder 206 may be configured to transfer or transport the extraction material to the distributor 208. In some embodiments, the extraction material may be gravity fed to the distributor 208. In some embodiments, an auger or other mechanism may be configured to transfer or transport the extraction material to the distributor 208.

The distributor 208 may include a recess configured to hold the extraction material. In some embodiments, the distributor 208 may include a sensor configured to determine an amount/volume of extraction material in the distributor 208. The distributor 208 may include a plurality of distribution paths 209. The plurality of distribution paths 209 may be configured to transfer or transport the extraction material to the plurality of second gates 214. In some embodiments, as shown in FIG. 2B, the distributor 208 may include a dividing mechanism 208A. The dividing mechanism 208A may be configured to ensure a same amount/volume and/or substantially the same amount/volume of the extraction material is transferred or transported to each of the plurality of distribution paths 209.

Each of the plurality of second gates 214 may be positioned below one of distribution paths of the plurality of distribution paths 209. In some embodiments, each of the plurality of second gates 214 may include one or more cells 210. In some embodiments, the plurality of distribution paths 209 may be configured to transfer or transport the extraction material to the one or more cells 210 of the plurality of second gates 214.

The plurality of second gates 214 may be configured to rotate to position a first cell 210A of the one or more cells 210 beneath the plurality of distribution paths 209. When the first cell 210A of the one or more cells 210 is positioned beneath the plurality of distribution paths 209, extraction material in the plurality of distribution paths 209 may enter the first cell 210A of the one or more cells 210 to fill the first cell 210A with extraction material.

In some embodiments, when the first cell 210A is filled with extraction material, the plurality of second gates 214 may rotate to position a second cell 210B of the one or more cells 210 beneath the plurality of distribution paths 209. When the second cell 210B of the one or more cells 210 is positioned beneath the plurality of distribution paths 209, extraction material in the plurality of distribution paths 209 may enter the second cell 210B of the one or more cells 210 to fill the second cell 210B with extraction material.

The first gate 212 may be positioned between the distribution paths 209 and the plurality of second gates 214. The first gate 212 may include a disc with a plurality of holes 216. The first gate 212 may be configured to rotate between an open position and a closed position. When the first gate 212 is in the open position the plurality of holes 216 may be positioned beneath (e.g. aligned with) the plurality of distribution path 209. Accordingly, extraction material in the plurality of distribution paths 209 may enter the one or more cells 210 of the plurality of second gates 214. When the first gate 212 is in the closed position, the first gate 212 may prevent or inhibit the extraction material in the plurality of distribution paths 209 from entering the one or more cells 210 of the plurality of second gates 214.

In some embodiments, the plurality of second gates 214 may be coupled to a platform 220. In some embodiments, the platform 220 may include a plurality of holes 222, as shown in FIG. 2C. The plurality of holes 222 may be positioned above a plurality of chamber distribution paths 226. The plurality of chamber distribution paths 226 may be configured to transfer or transport the extraction medium in the one or more cells 210 to the plurality of extraction chambers 202.

In some embodiments, when the plurality of second gates 214 rotate to position the second cell 210B of the one or more cells 210 beneath the plurality of distribution paths 209, the first cell 210A may be positioned above (e.g. aligned with) the plurality of holes 222 of the platform 220, and/or when the plurality of second gates 214 rotate to position the first cell 210A of the one or more cells 210 beneath the plurality of distribution paths 209, the second cell 210B may be positioned above the plurality of holes 222 of the platform 220. Accordingly, the extraction medium in the first cell 210A and/or the second cell 210B may be transported or transferred to the extraction chambers 202 via the plurality of chamber distribution paths 226. In some embodiments, the extraction material may be gravity fed through the plurality of chamber distribution paths 226 from the first cell 210A and/or the second cell 210B to the plurality of extraction chambers 202.

In some embodiments, one or more of the plurality of second gates 214 may be rotated to transfer extraction material to empty extraction chambers 202 of the plurality of extraction chambers 202 and/or the corresponding chambers distribution paths 226.

Figure 3:
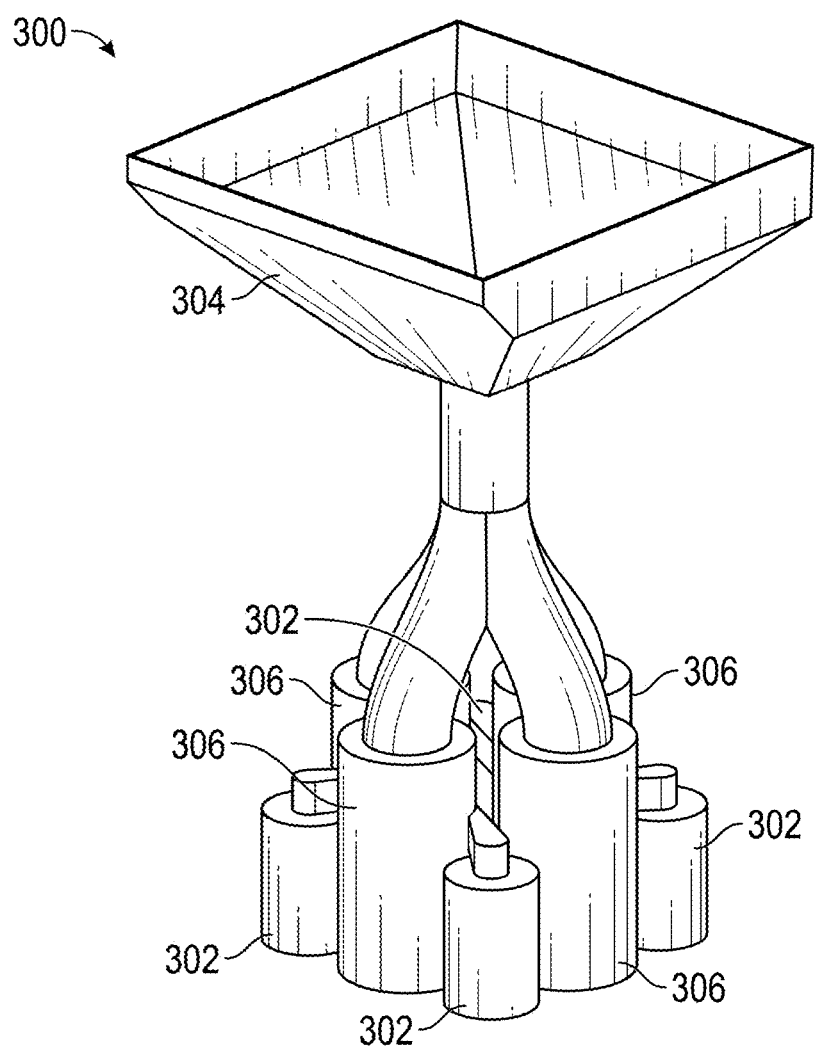
FIG. 3 illustrates another system for providing extraction material to a plurality of extraction chambers.
Figure 4A:
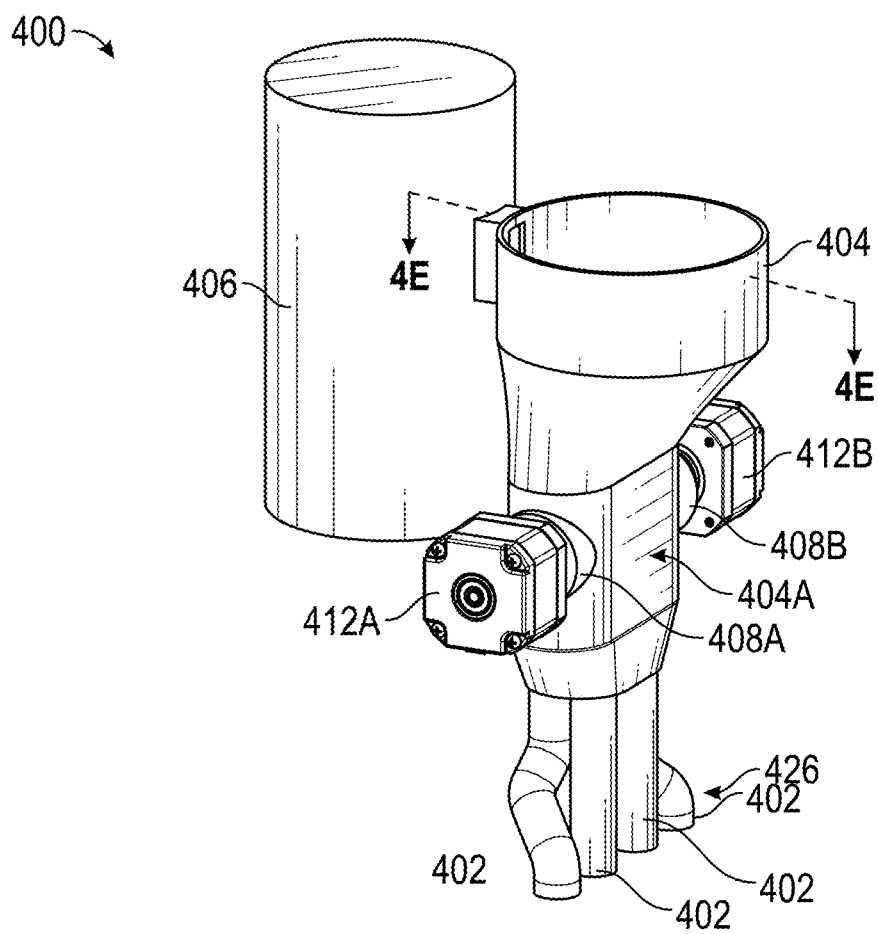
FIGS. 4A-4D illustrate another system for providing extraction material to a plurality of extraction chambers.
Figure 4B:
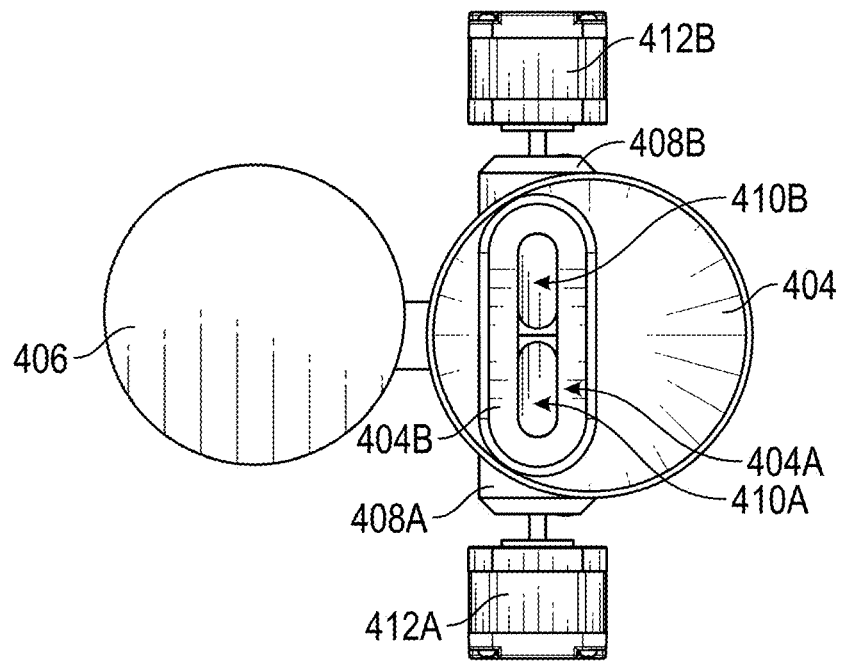
Figure 4C:
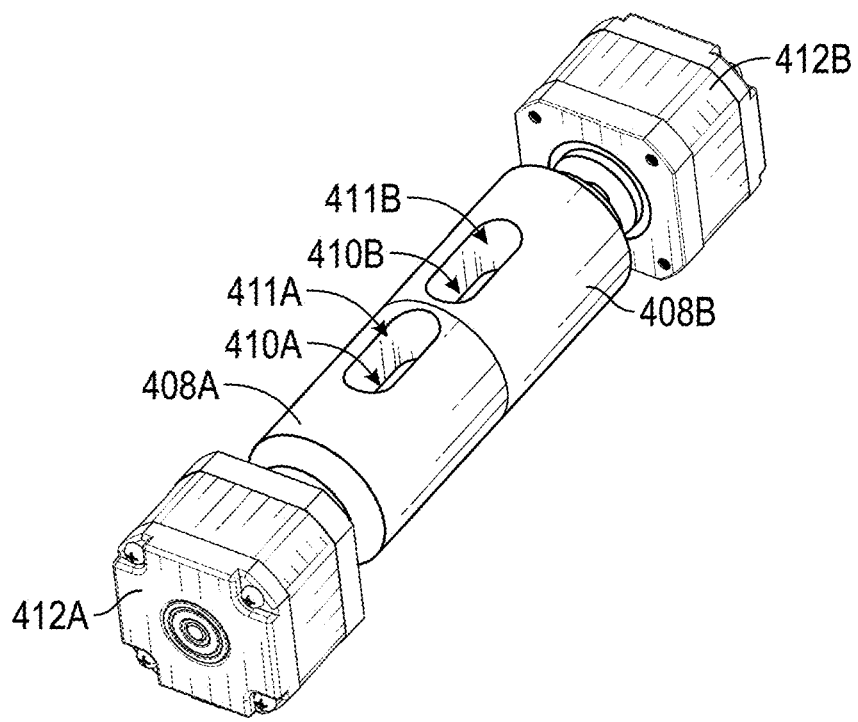
Figure 4D:
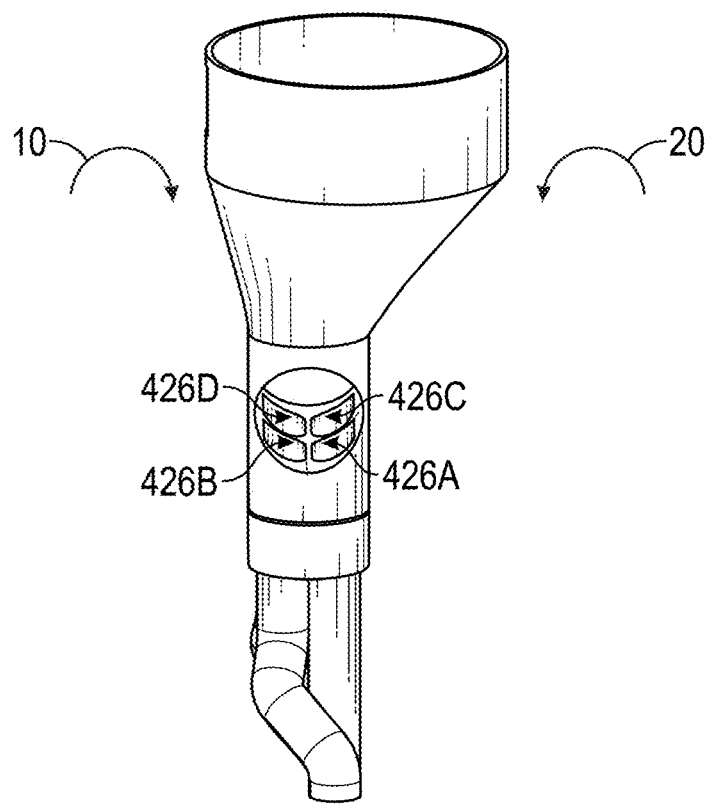
Figure 4E:
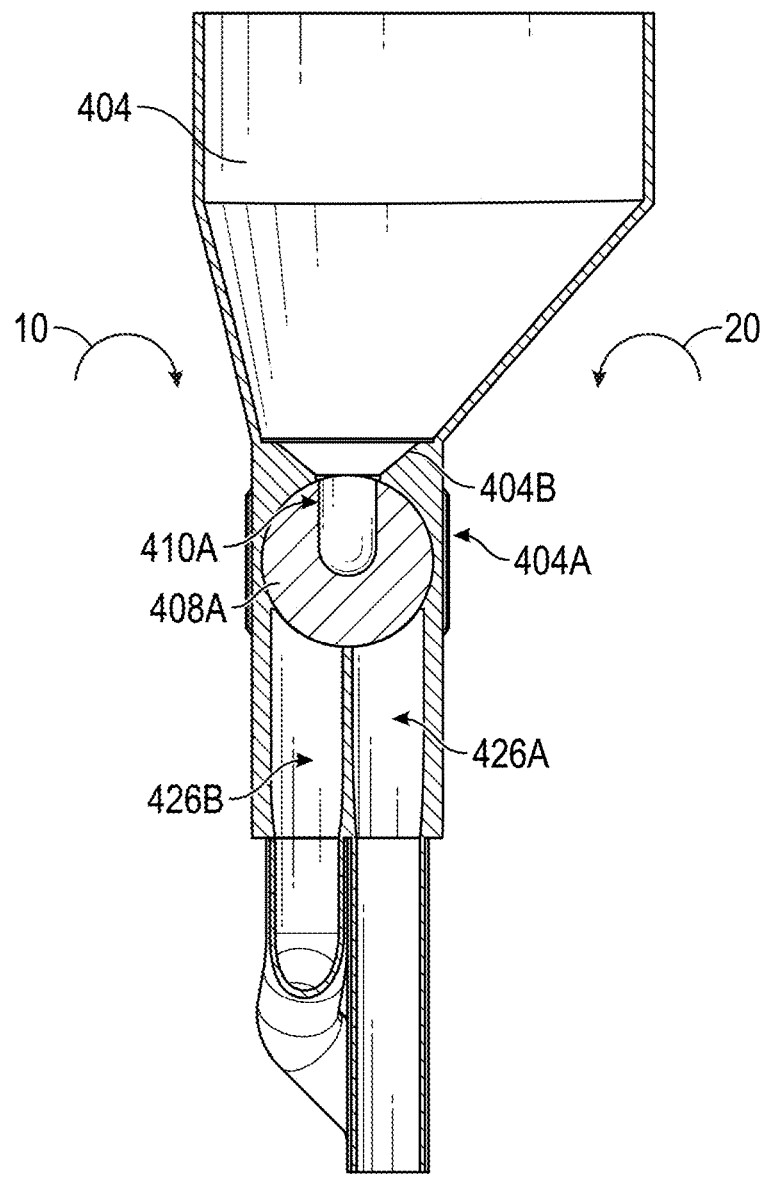
FIG. 4E illustrates a distributor of the system for providing extraction material to a plurality of extraction chambers of FIGS. 4A-4D.

FIG. 3 shows an embodiment of a system 300 for providing extraction material to a plurality of extraction chambers 302. The system 300 may include a hopper 304, a plurality of grinders 306, and/or the plurality of extraction chambers 302. The hopper 304 may be configured to hold a beverage ingredient. In some embodiments, the beverage ingredient may include an edible substance and may also be, in whole or in part (e.g., ground), at least one of green coffee cherries, red coffee cherries, white coffee, roasted coffee beans, unroasted coffee beans, espresso coffee, coffee flowers, coffee cherry pulp, coffee cherry stalk, coffee cherry exocarp, or coffee cherry mesocarp. However, it should be appreciated that certain features and aspects of the embodiments disclosed herein may be applicable to other beverages besides coffee extracts, such as teas and other similar infusions. For example, in yet other embodiments, the beverage ingredient may be green tea leaves and/or partially or totally dehydrated tea leaves. In still further embodiments, the extraction medium may comprise fruits, nuts, or similar plant matter including vanilla beans, chocolate beans, hazelnuts, almond, macadamia, peanut, cinnamon, mint, apple, apricot, aromatic bitters, banana, blackberry, blueberry, celery, cherry, cranberry, strawberry, raspberry, juniper berry, brandy, cachaca, carrot, citrus, lemon, lime, orange, grapefruit, tangerine, coconut, menthol, ginger, licorice, milk, pecan, pistachio, walnut, peach, pear, pepper, among others. Thus, the description herein is not limited to espresso, coffee, coffee products, tea or tea products.

The hopper 304 may be configured to transfer or transport the beverage ingredient to each of the plurality of grinders 306. In some embodiments, the beverage ingredient may be gravity fed to the plurality of grinders 306. In some embodiments, an auger or other mechanism may be configured to transfer or transport the beverage ingredient to the grinder 306. In some embodiments, the hopper 304 may be configured to transfer or transport a predetermined amount/volume of the beverage ingredient to the plurality of grinders 306.

The plurality of grinders 306 may be configured to grind and/or crush the beverage ingredient from a whole configuration (e.g., whole coffee beans) to a ground configuration (e.g., ground coffee) to produce (e.g., generate) extraction material. The plurality of grinders 306 may be configured to grind and/or crush the beverage ingredients to a particular size. In some embodiments, the particular size may be based on a type of the beverage to be extracted from the plurality of extraction chambers 302. In some embodiments, the plurality of grinders 306 may include a blade grinder, a conical burr grinder, a flat burr grinder, and/or any other type of grinder.

In some embodiments, each of the plurality of grinders 306 may be configured to transfer or transport the extraction material to one of the plurality of extraction chambers 302. Each of the plurality of grinders 306 may be connected to a different extraction chamber 302 of the plurality of extraction chambers 302. When one or more extraction chambers 302 of the plurality of extraction chambers 302 are empty the plurality of grinders 306 may transfer or transport freshly produced (i.e., ground) extraction material to the one or more extraction chambers 302 of the plurality of extraction chambers 302. In some embodiments, one or more grinders 306 of the plurality of grinders 306 may grind and/or crush the beverage ingredient when a corresponding extraction chamber 302 of the plurality of extraction chambers 302 is empty. In some embodiments, one or more grinders 306 of the plurality of grinders 306 may be configured to grind and/or crush the predetermined amount/volume of the beverage ingredient when the corresponding extraction chamber 302 of the plurality of extraction chambers 302 is empty.

FIGS. 4A-4E show an embodiment of a system 400 for providing extraction material to a plurality of extraction chambers 402. The system 400 may include a grinder 406, and a distribution system 407. The distribution system 407 may include a hopper 404, a first distributor 408A, a second distributor 408B, and/or a plurality of chamber distribution paths 426.

The grinder 406 may be configured to grind and/or crush a beverage ingredient from a whole configuration (e.g., whole coffee beans) to a ground configuration (e.g., ground coffee) to produce (e.g., generate) extraction material. In some embodiments, the grinder 406 may receive the beverage ingredient from a hopper (not shown) configured to hold the beverage ingredient. The grinder 406 may be configured to grind and/or crush the beverage ingredient to a particular size. In some embodiments, the particular size may be based on a type of the beverage to be extracted from the plurality of extraction chambers 402. In some embodiments, the grinder 206 may include a blade grinder, a conical burr grinder, a flat burr grinder, and/or any other type of grinder. In some embodiments, the beverage ingredient may include an edible substance and may also be, in whole or in part (e.g., ground), at least one of green coffee cherries, red coffee cherries, white coffee, roasted coffee beans, unroasted coffee beans, espresso coffee, coffee flowers, coffee cherry pulp, coffee cherry stalk, coffee cherry exocarp, or coffee cherry mesocarp. However, it should be appreciated that certain features and aspects of the embodiments disclosed herein may be applicable to other beverages besides coffee extracts, such as teas and other similar infusions. For example, in yet other embodiments, the beverage ingredient may be green tea leaves and/or partially or totally dehydrated tea leaves. In still further embodiments, the extraction medium may comprise fruits, nuts, or similar plant matter including vanilla beans, chocolate beans, hazelnuts, almond, macadamia, peanut, cinnamon, mint, apple, apricot, aromatic bitters, banana, blackberry, blueberry, celery, cherry, cranberry, strawberry, raspberry, juniper berry, brandy, cachaca, carrot, citrus, lemon, lime, orange, grapefruit, tangerine, coconut, menthol, ginger, licorice, milk, pecan, pistachio, walnut, peach, pear, pepper, among others. Thus, the description herein is not limited to espresso, coffee, coffee products, tea or tea products.

The grinder 406 may be configured to transfer or transport the extraction material to the hopper 404, and the hopper 404 may be configured to hold the extraction material. In some embodiments, first distributor 408A and the second distributor 408B may be positioned at a bottom end 404A of the hopper 404.

The first distributor 408A and the second distributor 408B may include a cylindrical shape. The first distributor 408A may include a recess 410A and the second distributor 408B may include a recess 410B. The recess 410A of the first distributor 408A and the recess 410B of the second distributor 408B may be configured to receive an amount/volume of the extraction material from the hopper 404. The hopper 404 may be configured to gravity feed the extraction material to the recess 410A of the first distributor 408A and/or the recess 410B of the second distributor 408B.

The first distributor 408A may include an actuator 412A and the second distributor 408B may include an actuator 412B. The actuator 412A of the first distributor 408A may be configured to rotate (e.g. axially rotate) the first distributor 408A in a first direction 10 and/or a second direction 20 opposite the first direction. The actuator 412B of the second distributor 408B may be configured to rotate (e.g. axially rotate) the second distributor 408B in the first direction 10 and/or the second direction 20.

In some embodiments, when the first distributor 408A rotates in the first direction 10, the recess 410A may rotate in the first direction 10 so the recess 410A is positioned above a first chamber distribution path 426A of the plurality of chamber distribution paths 426. In some embodiments, when the first distributor 408A rotates in the second direction 20, the recess 410A may rotate in the second direction 20 so the recess 410A is positioned above a second chamber distribution path 426B of the plurality of chamber distribution paths 426. Accordingly, extraction material in the recess 410A may be transferred from the recess 410A to the first chamber distribution path 426A and/or the second chamber distribution path 426B.

In some embodiments, when the second distributor 408B rotates in the first direction 10, the recess 410B may rotate in the first direction 10 so the recess 410B is positioned above a third chamber distribution path 426C of the plurality of chamber distribution paths 426. In some embodiments, when the second distributor 408B rotates in the second direction 20, the recess 410B may rotate in the second direction 20 so the recess 410B is positioned above a fourth chamber distribution path 426D of the plurality of chamber distribution paths 426. Accordingly, extraction material in the recess 410B may be transferred from the recess 410B to the third chamber distribution path 426C and/or the fourth chamber distribution path 426D.

In some embodiments, the extraction material may be gravity fed through the plurality of chamber distribution paths 426 (i.e., the first chamber distribution path 426A, the second chamber distribution path 426B, the third chamber distribution path 426C, and/or the fourth chamber distribution path 426D) to the plurality of extraction chambers 402.

In some embodiments, when the first distributor 408A rotates in the first direction 10 and/or the second direction 20, a portion 404B of the hopper 404 positioned at the bottom end 404A of the hopper 404 may push a portion of the extraction material in the recess 410A positioned above an opening 411A to the recess 410A (i.e., excess extraction material) to keep or retain the extraction material in the hopper 404. In some embodiments, when the second distributor 408B rotates in the first direction 10 and/or the second direction 20, the portion 404B of the hopper 404 positioned at the bottom end 404A of the hopper 404 may push the portion of the extraction material in the recess 410B positioned above an opening 411B to the recess 410B (i.e., excess extraction material) to keep or retain the extraction material in the hopper 404. Accordingly, the first distributor 408A and/or the second distributor 408B may transfer or transport a consistent amount/volume of the extraction material (i.e., the volume of the recess 410A and/or the recess 410B) to the plurality of the chamber distribution paths 426.

In some embodiments, the first distributor 408A may be configured to automatically and dynamically modify the volume of the recess 410A and/or the second distributor 408B may be configured to automatically and dynamically modify the volume of the recess 410B. In some embodiments, the first distributor 408A and/or the second distributor 408B may each include an inner cylinder configured to rotate relative to the first distributor 408A and/or the second distributor 408B. In some embodiments, when the inner cylinder rotates relative to the first distributor 408A and/or the second distributor 408B the inner cylinder can modify a depth and/or the volume of the recess 410A and/or the recess 410B. In some embodiments, the first distributor 408A and/or the second distributor 408B may each include a recess actuator configured to modify a depth of a bottom surface of the recess 410A and/or the recess 410B to modify the depth and/or the volume of the recess 410A and/or the recess 410B.

In some embodiments, the first distributor 408A may modify the volume of the recess 410A and/or the second distributor 408B may modify the volume of the recess 410B based on the extraction material, a beverage order, and/or a size of the beverage order.

In some embodiments, the first distributor 408A and/or the second distributor 408B may be configured to transfer to empty extraction chambers 402 of the plurality of extraction chambers 402 and/or the corresponding chambers distribution paths 426.

Figure 5:
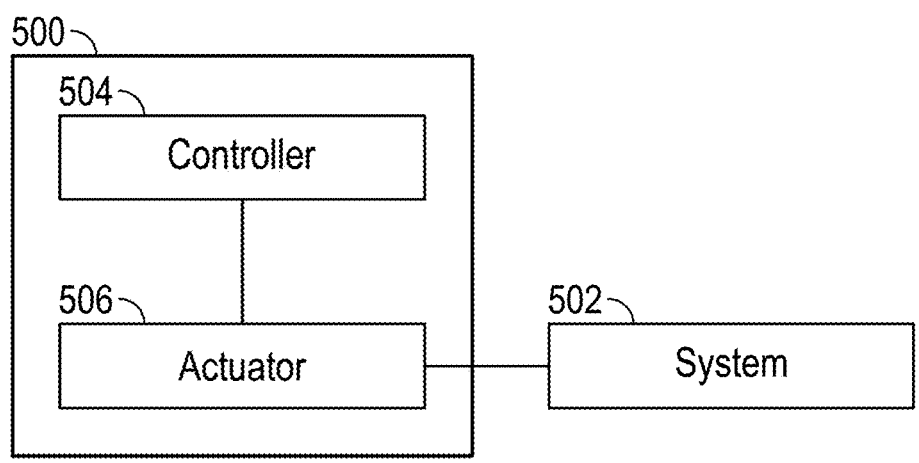
FIG. 5 illustrates a schematic of a system for preventing or inhibiting extraction material from getting stuck or caught in the one or more components of a system for providing extraction material to a plurality of extraction chamber.

FIG. 5 illustrates a schematic of a system 500 for preventing or inhibiting extraction material from getting stuck or caught in the one or more components of a system 502 for providing extraction material to a plurality of extraction chambers. The system 502 may include any of the features systems 100, 200, 300, 400.

In some embodiments, the system 500 may include a controller 504 and an actuator 506. The actuator 506 may be coupled to one or more components of the system 502 (e.g., a hopper, a distribution system, a grinder, a distributor, a plurality of distribution paths, the plurality of cells, a plurality of chamber distribution paths, a plurality of extraction chambers, etc.). In some embodiments, the system 500 may include a plurality of actuators 506. In some embodiments, the actuator 506 may include a piezoelectric actuator. The actuator 506 may be configured to vibrate the one or more components of the system 500. The actuator 506 may vibrate the one or more components of the system 500 in order to prevent or inhibit the extraction material from getting stuck or caught in the one or more components of the system 502. The controller 504 may instruct the actuator 506 to vibrate, to stop vibrating, and/or a frequency to vibrate at. In some embodiments, the controller may instruct the actuator 506 to vibrate at a predetermined frequency. The predetermined frequency may include a natural frequency (e.g., resonance frequency) of each of the one or more components of the system 502. In some embodiments, vibrating the actuator 506 at the natural frequency (e.g., resonance frequency) of a component may amplify the vibration of the component. The actuator 506 amplification of the vibration of the component may occur due to resonance of the component. In some embodiments, the natural frequency of a component may be determined by performing a dynamic finite element analysis. The dynamic finite element analysis may be performed using simulation software and/or any other software configured to perform dynamic finite element analysis. In some embodiments, the natural frequency may be determined using Equation 1 below:

$$NF = 2\sqrt{\frac{k}{m}}$$ Equation 1

The natural frequency (NF) of a component may be the square root of a quotient of a stiffness (k) of the component and a mass (m) of the component. In some embodiments, the natural frequency (NF) may be expressed in radians per second. In some embodiments, the natural frequency (NF) may be converted to Hertz (Hz) by multiplying the natural frequency (NF) by 180/π.

In some embodiments, the stiffness (k) may be determined using Equation 2 below:

$$k = E \times \frac{A}{L} \quad \text{Equation 2}$$

The stiffness (k) of the component may be the product of an elastic modulus (E) of the component, and the quotient of a cross-sectional area (A) of the component and a length (L) of the component.

Although the specification describes the distribution systems 107, 207, and 407 as providing extraction material from a grinder to a plurality of extraction chambers, the distribution systems 107, 207, and 407 could also be used to provide a beverage ingredient from a hopper to a plurality of grinders, or as a standalone beverage extraction material dispenser.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

SUMMARY

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. In addition, although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of preparing edible extracts and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A system for distributing extraction material to a plurality of extraction chambers, the system comprising:
    a hopper configured to hold a beverage ingredient;
    a grinder configured to grind the beverage ingredient to generate extraction material;
    a distribution system configured to transfer the extraction material from the grinder to a plurality extraction chambers, the distribution system comprises:
        a distributor configured to transfer extraction material from the grinder to a plurality of distribution paths;
        a plurality of chamber distribution paths configured to direct extraction material to the plurality of extraction chambers; and
        a plurality of cells, each cell of the plurality of cells positioned between one of the plurality of distribution paths and one of the plurality of chamber distribution paths, each cell configured to receive the extraction material from one of the plurality of distribution paths,
    wherein the distribution system is configured to transfer a predetermined amount of the extraction material to each empty extraction chamber of the plurality of extraction chambers,
    wherein each cell is configured selectively transfer the predetermined amount of extraction material to one or more of the chamber distribution paths, and
    wherein a total amount of extraction material provided to the plurality of extraction chambers is an amount of extraction material for one beverage component.

2. The system of claim 1 further comprising a piezoelectric actuator configured to vibrate the distribution system to prevent or inhibit the extraction material from getting stuck in the distribution system.

3. The system of claim 1, wherein, in use, the distributor is configured to provide a same amount of extraction material to each distribution path of the plurality of distribution paths.

4. The system of claim 1, wherein the hopper is a first hopper and the distribution system comprises:
    a second hopper configured to receive extraction material from the grinder; and
    a plurality of distributors positioned at a bottom end of the second hopper each distributor of the plurality of distributors comprising a recess configured to receive extraction material from the second hopper,
    wherein, in use, the plurality of distributors are configured to rotate in a first direction to transfer extraction material to a first set of chamber distribution paths of the plurality of chamber distribution paths and a second direction to transfer extraction material to a second set of chamber distribution paths of the plurality of chamber distribution paths.

5. The system of claim 1, wherein the distribution system further comprises:
    a first gate positioned between the plurality of distribution paths and the plurality of cells, the first gate configured to move between an open position and a closed position, wherein when the first gate is in the open position, extraction material in the plurality of distribution paths enters the plurality of cells and when the first gate is in the closed position the first gate prevents extraction material from entering the plurality of cells.

6. The system of claim 5, wherein the first gate is configured to rotate to move between the open position and the closed position.

7. The system of claim 5, further comprising a plurality of second gates positioned between the plurality of cells and the plurality of chamber distribution paths,
wherein the plurality of second gates are configured to independently move between an open position and a closed position,
wherein when the plurality of second gates are in the open position, extraction material in the plurality of cells is transferred to the plurality of chamber distribution paths, and when the plurality of second gates are in the closed position, the plurality of second gates prevent extraction material in the plurality of cells from transferring to plurality of chamber distribution paths.

8. The system of claim 7, wherein a second gate of the plurality of second gates is moved to an open position when a corresponding extraction chamber is empty.

9. The system of claim 5, further comprising a plurality of second gates, each second gate comprising one or more cells of the plurality of cells, wherein the plurality of second gates are configured to rotate to move the one or more cells from a first position to a second position.

10. The system of claim 9, wherein the one or more cells are positioned below the plurality of distribution paths when the one or more cells are in the first position and the one or more cells are positioned above the plurality of chamber distribution paths when the one or more cells are in the second position.

11. A system for distributing extraction material to a plurality of extraction chambers, the system comprising:
a hopper configured to hold a beverage ingredient;
a plurality of grinders configured to grind the beverage ingredient to generate extraction material;
a piezoelectric actuator configured to vibrate the system to prevent or inhibit the extraction material from getting stuck in the hopper and/or the plurality of grinders; and
a plurality of extraction chambers,
wherein the hopper is configured to transfer the beverage ingredient to the plurality of grinders, and wherein each of the plurality of grinders are connected to a different extraction chamber of the plurality of extraction chambers, and wherein a predetermined amount of the extraction material is transferred from each of the plurality of grinders to the different extraction chambers of the plurality of extraction chambers.

12. The system of claim 11, wherein each of the plurality of grinders are configured to grind the predetermined amount of the extraction material.

13. The system of claim 11, wherein, in use, a predetermined amount of the beverage ingredient is transferred from the hopper to each of the plurality of grinders.

14. The system of claim 11, wherein, in use, a total amount of extraction material provided to the plurality of extraction chambers is an amount of extraction material for one beverage component.

15. The system of claim 11, wherein, in use, the extraction material is transferred from one or more grinders of the plurality of grinders to the different extraction chamber when the different extraction chamber is empty.

16. The system of claim 15, wherein, in use, a predetermined amount of beverage ingredient is transferred from the hopper to the one or more grinders.

\* \* \* \* \*